US011604730B2

(12) United States Patent
Pal et al.

(10) Patent No.: US 11,604,730 B2
(45) Date of Patent: Mar. 14, 2023

(54) REDUNDANT CACHE-COHERENT MEMORY FABRIC

(71) Applicant: Intel Corporation, Santa Clara, CA (US)

(72) Inventors: Rahul Pal, Bangalore (IN); Philip Abraham, Burlingame, CA (US); Ajaya Durg, Austin, TX (US); Bahaa Fahim, Santa Clara, CA (US); Yen-Cheng Liu, Portland, OR (US); Sanilkumar Mm, Ernakulam (IN)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 16/939,197

(22) Filed: Jul. 27, 2020

(65) Prior Publication Data
US 2021/0200678 A1   Jul. 1, 2021

(30) Foreign Application Priority Data

Jun. 26, 2020 (IN) .............................. 202041027215

(51) Int. Cl.
*G06F 12/08* (2016.01)
*G06F 12/0815* (2016.01)
*G06F 11/10* (2006.01)
*G06F 12/0893* (2016.01)

(52) U.S. Cl.
CPC ...... *G06F 12/0815* (2013.01); *G06F 11/1004* (2013.01); *G06F 12/0893* (2013.01)

(58) Field of Classification Search
None
See application file for complete search history.

(56) References Cited

U.S. PATENT DOCUMENTS

| | | | |
|---|---|---|---|
| 8,972,637 B1 * | 3/2015 | Hushon, Jr. ............. | G06F 13/42 710/15 |
| 2011/0078384 A1 * | 3/2011 | Kumar ................ | G06F 12/0817 711/143 |
| 2016/0203080 A1 * | 7/2016 | Bert ........................ | G06F 11/16 711/114 |
| 2017/0034268 A1 * | 2/2017 | Govind ............... | H04L 67/1008 |
| 2017/0091092 A1 * | 3/2017 | Hur ..................... | G06F 12/0833 |
| 2017/0191092 A1 | 7/2017 | Hsieh et al. | |
| 2019/0163583 A1 * | 5/2019 | Fahim ................... | G06F 9/3818 |
| 2020/0348985 A1 * | 11/2020 | O'Bleness ............ | G06F 9/5038 |

OTHER PUBLICATIONS

European Search Report dated Jun. 9, 2021 for European patent Application No. 20214701.3.

* cited by examiner

*Primary Examiner* — Tracy C Chan
(74) *Attorney, Agent, or Firm* — Banner & Witcoff Ltd.

(57) ABSTRACT

A processor, including a core; and a cache-coherent memory fabric coupled to the core and having a primary cache agent (PCA) configured to provide a primary access path; and a secondary cache agent (SCA) configured to provide a secondary access path that is redundant to the primary access path, wherein the PCA has a coherency controller configured to maintain data in the secondary access path coherent with data in the main access path.

26 Claims, 7 Drawing Sheets

600
Coherency Checks

| Failure Mode | Manifestation | Hardware Check Incorporated | Checker Location |
|---|---|---|---|
| Message Corruption | Snoop request/address corruption | Snooped core sends snoop request's (opcode/address) CRC with snoop response. PCA forwards this to requester redundant access manager (RDM) with GO signal where it is checked against original request. | Requestor RDM |
| | Snoop data corrupt | Redundancy already catches clean data mismatch cases. | NA |
| | | Dirty data CRC sent snooped core's RDM to SMC to compare with IWB data, at checker added in SMC. | Secondary MC |
| | Response corrupt | Response CRC also sent with snoop response packet, compared at PCA. | Primary CA |
| | | Case of entire snoop response packet interchange is caught by request CRC check outlined above. | Requestor RDM |
| Message Address | Fault in Snoop Filter | Caught by ECC on snoop filter tag. | Primary CA |
| | Response went to wrong CA | Caught by timeout at PCA. | Primary CA |
| | | Or in case of aliasing to another entry (/interchange) by request CRC check. | |
| | PCA receives a fault on core valid bit (CV) update or read CV | Checker verifies final snoop filter update value contains current requestor core. | Primary CA |
| | | Checker verifies snoop filter read CV against snoop sent later in pipe. | |
| Message loss/delay/peer failure | CA did not send snoop | Same as above. | Same as above |
| | Snoop drop | Timeout | Primary CA |
| | Response/data drop | Timeout | Primary CA |
| Message Insert/repeat | Spurious snoop | Always IWB dirty data to memory to prevent data loss | NA |

800
Method of Processing

REDUNDANT CACHE-COHERENT MEMORY FABRIC

TECHNICAL FIELD

The present disclosure relates to a redundant cache-coherent fabric memory fabric.

BACKGROUND

Achieving a high degree of FUnctional SAfety (FUSA) is critical in Advanced Driver Assistance Systems (ADAS) and industrial applications. L3/L4 ADAS systems that are almost fully autonomous, for example, need to meet Automotive Safety Integrity Level (ASIL) C/D levels of fault detection per the International Organization for Standardization (ISO) 26262 specification. At the same time, these applications require complex multiprocessor systems in order to meet computational requirements. Such multiprocessors usually have a cache-coherent architecture with a shared cache hierarchy. In order to meet ASIL C/D requirements for these multiprocessors, random hardware faults that can occur during a transaction on the cache-coherent memory fabric need to be detectable.

A prior method redundantly processed transactions to a designated-safe address space, including coherency messages. This was accomplished by partitioning a coherency controller, shared cache, and memory into two identical but distinct halves. These halves operated on a same transaction in a completely independent, asynchronous manner. A requesting processor core side safety checker detected faults by comparing the responses received from both halves. And prior software-based mechanisms ran multiple processors in a coarse, lockstep manner and compared intermittent results during regular time windows.

The prior high performance cache-coherent memory fabrics have complicated microarchitectures and present validation challenges. Two independent coherency controllers on a same address space might make different decisions in granting access request ownership, which might then require retries, serialization, virtual channels, etc. to resolve. There are also risks of performance glassjaws due to the additional coherency management overhead. And the prior software-based mechanisms incur significant cost of multiple systems, as well as performance overhead to orchestrate lockstep operation.

DESCRIPTION OF THE ASPECTS

The present disclosure is directed to fault detection in memory accesses flowing across a redundant cache-coherent memory fabric in a processor. Processors with such a fabric may be deployed with minimal software impact in high-grade FUSA-certified systems (e.g., ASIL C/D level) that are required for computing in ADAS and other safety-critical applications.

Modern day processors usually have multiple cores with internal coherent caches coupled to a fabric (uncore) having of shared memory and, optionally, one or more levels of shared cache. The fabric not only facilitates the cache/memory access requests, but also has mechanisms to keep the core caches coherent. These coherency mechanisms include having a snoop filter for snooping cores, and forward associated response data and resolve conflicts between different core access requests. These mechanisms are housed in a caching agent in the cache-coherent memory fabric, along with an optional shared cache level. The caching agent and associated shared cache are commonly addressed (banked) and implemented as multiple distributed physical instances. The shared memory is comprised of multiple memory channels based on bandwidth requirements; with their own control pipes, these memory channels often are housed behind different memory controllers.

This disclosure divides a memory access request transaction into two parts—coherency management and cache/memory access. The cache/memory access has full redundancy, however, only one of the access paths has a coherency controller. The coherence controller takes on the additional responsibility of keeping data in the redundant access path consistent. To detect any faults that can occur in the coherency management, the coherency controller is supplemented with a fault checker.

Figure 1:
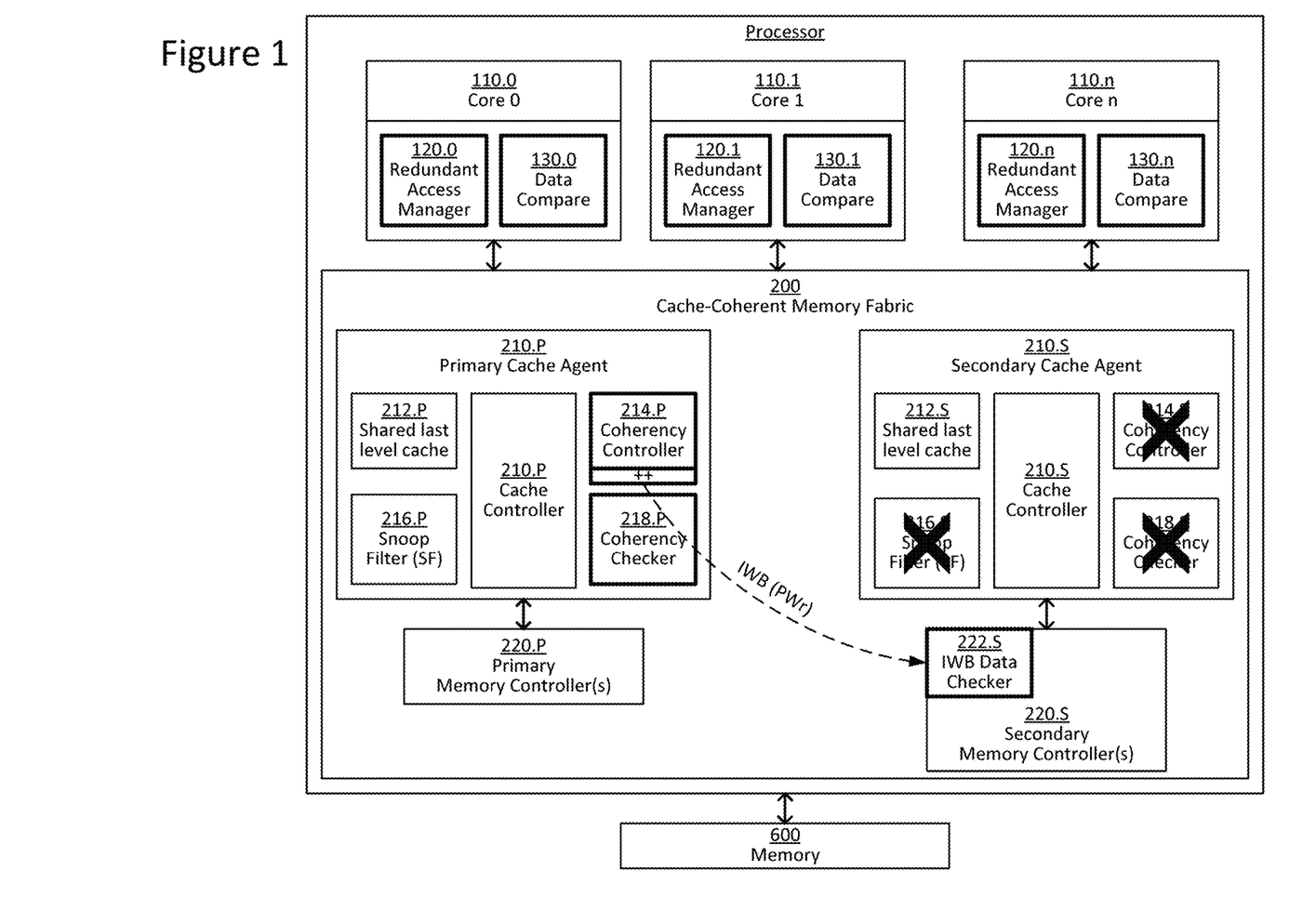
FIG. 1 illustrates a schematic diagram of a processor having a cache-coherent memory fabric in accordance with aspects of the disclosure.

FIG. 1 illustrates a schematic diagram of a processor having a cache-coherent memory fabric in accordance with aspects of the disclosure.

The processor comprises one or more cores 110 (110.0, 110.1 ... 110.n), redundant access managers 120 (120.0, 120.1 ... 120.n), data comparators 130 (130.0, 130.1 ... 130.n), and a cache-coherent memory fabric 200. The processor is coupled to a memory 700, which may be portions of main memory locally coupled to the processor.

The processor may be a general-purpose processor, coprocessor, or special-purpose processor, such as, for example, a network or communication processor, compression engine, graphics processor, GPGP (general purpose graphics processor), a high-throughput many integrated core (MIC) coprocessor, embedded processor, or the like. The processor may be implemented on one or more chips. The processor may be a part of and/or may be implemented on one or more substrates using any of a number of process technologies.

The cores 110 may be homogenous or heterogeneous with respect to one another in terms of architecture instruction set.

The cache-coherent memory fabric 200 is coupled between the cores 110 and the memory 700, and is designed for high functional safety. The cache-coherent fabric 200 provides a primary access path and a secondary access path that is redundant to the primary access path. More specifically, the cache-coherent fabric 200 is divided into primary and secondary paths comprising two caching agents CA (primary CA (PCA) 210.P and secondary CA (SCA) 210.S) and associated memory controllers MC (primary MC (PMC) 220.P and secondary MC (SMC) 220.S). Each partition comprises half the physical instances of CA (PCA 210.P or SCA 210.S) and MC (PMC 220.P or SMC 220.S). This partitioning may be done exclusively on memory address regions in the memory 700 allocated to safety critical applications. Core requests to safe regions are redundantly serviced by both these partitions, and thus safety-critical applications will have only half of the total available memory and shared cache capacity and bandwidth. However, non-safety critical applications will have full resources.

The redundant access managers 120 (120.0, 120.1 . . . 120.$n$) are provided at the respective cores 110 (110.0, 110.1 . . . 110.$n$). The redundant access managers 120 are configured to distribute an access request from a core 100 to the PCA 210.P, and a redundant copy of the access request to the SCA 210.S, as described in detail below.

The data comparators 130 (130.0, 130.1 . . . 130.$n$) are provided at the respective cores 110 (110.0, 110.1 . . . 110.$n$). The data comparators 130 are configured to compare data read through the primary access request path in response to the access request, with redundant data read through the secondary access path in response to the redundant copy of the access request. This enables the data comparator 130 to detect deviations caused by random faults occurring in the cache-coherent memory fabric 200. The effectiveness of this mechanism is similar to redundancy using asymmetric systems. Differing responsibilities of the primary and secondary halves, as well as differing transaction paths from the core 110, make the redundant servicing of an access request in this cache-coherent memory fabric 200 asymmetric in time and state, reducing probability of an environment/external factor dependent failure impacting both sides in a similar manner.

The PCA 210.P comprises a cache controller 210.P, a shared last level cache 212.P, a coherency controller 214.P, a snoop filter 216.P, and a coherency checker 218.P. The two logical CAs (PCA 210.P and SCA 210.S) are not equal in all capabilities. SCA 210.S disables (or never comprises) mechanisms for maintaining coherency, that is, coherency controller 214.S, snoop filter 216.S, and coherency checker 218.S. The SCA 210.S, however, has an equal amount of shared cache and connects to equal memory resources as the PCA 210.P, allowing the SCA 210.S to sustain similar performance as the PCA 210.P. The SCA 210.S comprises a cache controller 210.S and a shared last level cache 212.S; the SMC 220.S also has an implicit write back (IWB) data checker 222.S, as described below.

The cache controller 210.P is configured to copy code or data from the memory 700 to cache. The cache controller 210.P intercepts and processes read/write memory access requests from the cores 110 before passing the access requests on to the PMC 220.P and/or SMC 220.S.

The shared last level cache 212.P is part of a memory hierarchy, much of the rest of which is not shown. The memory hierarchy includes one or more levels of cache within the cores 110, a set or one or more shared caches, and external memory 700 coupled to the PMC 220.P and the SMC 220.P. The set of shared caches may include one or more mid-level caches, such as level 2 (L2), level 3 (L3), level 4 (L4), or other levels of cache, the last level caches 212, and/or combinations thereof. As is described herein, coherency is maintained between the caches and cores 110.

The coherency controller 214.P, which is provided in the PCA 210.P but not the SCA 210.S, is configured to maintain cache coherency, that is, data in the secondary access path coherent with data in the main access path. This is described in detail below.

The snoop filter 216.P is directory-based and monitors coherent traffic in order to keep track of the coherency states of caches and cores 110. The snoop filter 216.P knows the caches and cores 110 that have a copy of a cache line.

The coherency checker 218 is shown as provided in the PCA 210.P. Alternatively, the coherency checker 218 may be distributed between PCA 210.P and the redundant access manager 120. The coherency checker 218 is not provided in the SCA 210.S. The coherency checker 218 is configured to detect faults in the coherency controller 214.P. The redundancy at the SCA 210.S does not cover the coherency processing, and thus the coherency checker 218 and actions at the PCA 210.P/redundant access manager 120 detect faults during coherency processing. The required checks are arrived at based on a detailed Failure Mode analysis. The potential ways coherency processing can fail are listed in the Table shown in FIG. 6.

The PMC 220.P and the SMC 220.S are configured to manages data flow to and from the memory 700. The SMC 220.S comprises an implicit write back (IWB) data checker 222.S, as described below.

Figure 2:
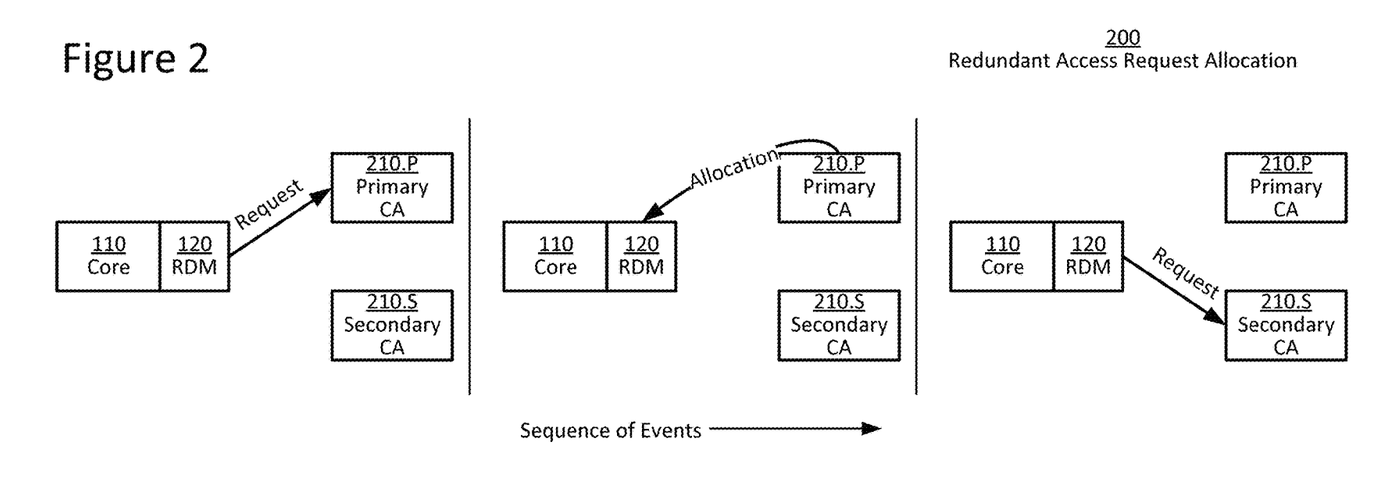
FIG. 2 illustrates a sequence diagram of a redundant access request allocation in accordance with aspects of the disclosure.

FIG. 2 illustrates a sequence diagram 200 of a redundant access request allocation in accordance with aspects of the disclosure.

Read and write access requests to safe address regions of the memory 700 are redundantly distributed by the redundant access manager 120 to both the PCA 210.P and SCA 210.S. The PCA 210.P controls the determination of which requests are being currently processed based on its resource availability and resolution of address conflicts between requests from different cores 110. The PCA 210.P then coordinates with the redundant access manager 120 to issue a redundant access request to the SCA 210.S and ensure the SCA 210.S operates in sync with the PCA 210.P.

More specifically, the cache controller 210.P of the PCA 210.P selects an access request, which is from one of the cores 110 and is to be processed by the PCA 210.P. The cache controller 210.P of PCA 210.P then sends an allocation signal to the redundant access manager 120. The redundant access manager 120 is configured to, after receiving the allocation signal, send to the SCA 210.S the redundant copy of the access request.

Figure 3:
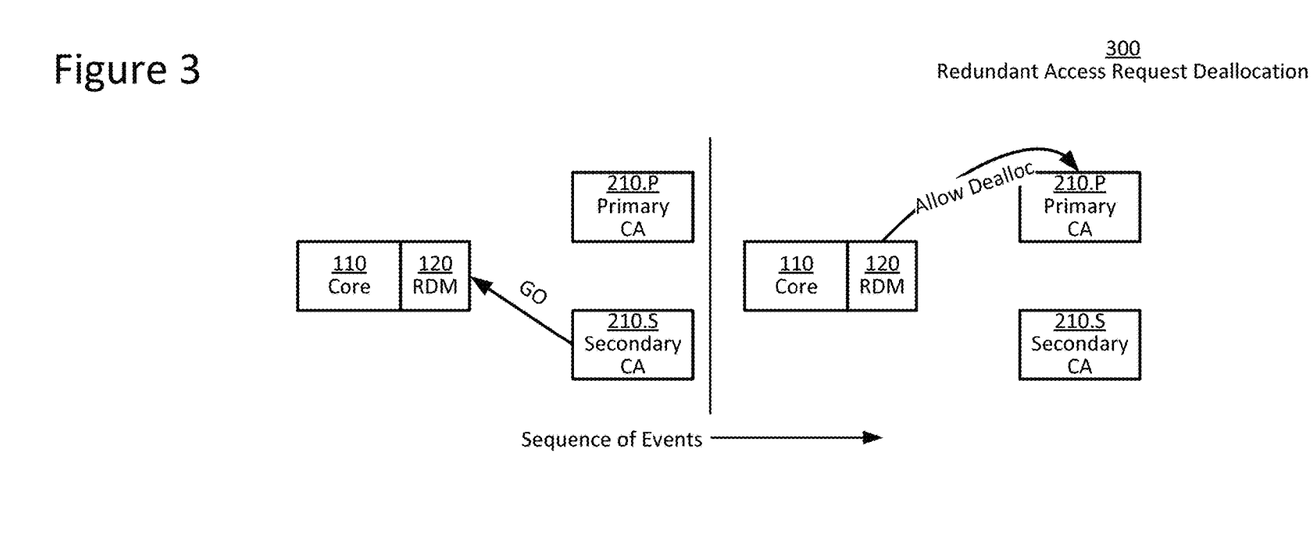
FIG. 3 illustrates a sequence diagram of a redundant access request deallocation in accordance with aspects of the disclosure.

FIG. 3 illustrates a sequence diagram 300 of a redundant access request deallocation in accordance with aspects of the disclosure.

Deallocation is also coordinated to ensure that PCA 210.P is allowed to deallocate, and thus potentially accept another core's request to the same address, but only after the SCA 210.S has completed processing the redundant copy of the access request. The PCA 210.P can deallocate anytime it has received an allow deallocation signal from the redundant access manager 210 and finished its processing of the access request.

More specifically, the redundant access manager 120 is configured to, after receiving from the SCA 210.S a global observation (GO) signal indicating coherency that the SCA 210.S has completed processing the redundant copy of the access request, send to the PCA 210.P an allow-deallocation signal permitting the PCA 210.P to deallocate after completing its processing of the access request.

Figure 4:
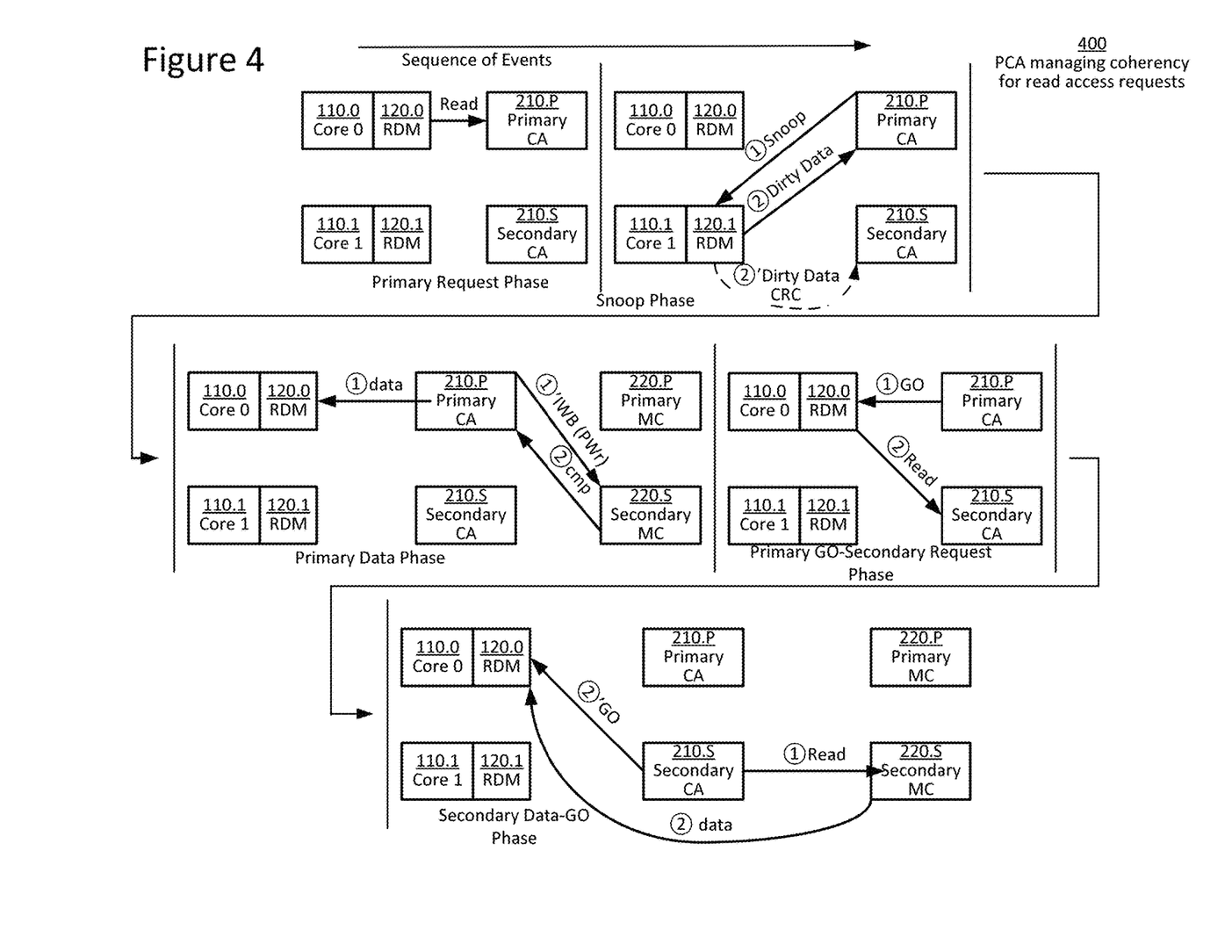
FIG. 4 illustrates a sequence diagram of primary cache agent managing coherency for read access requests in accordance with aspects of the disclosure.

FIG. 4 illustrates a sequence diagram 400 of primary cache agent managing coherency for read access requests in accordance with aspects of the disclosure.

By way of overview, in absence of any coherency requirements the two CAs (PCA 210.P and SCA 210.S) should return the same data in response to core read access requests. However when coherency needs to be maintained, two other elements need to be addressed: SCA 220.S needs to return consistent data, and any fault on coherency mechanisms deployed by the PCA 220.P needs to be detectible.

If a particular address is modified and cached in an internal core cache, the SCA 210.S is not able to detect this condition or retrieve this data. To ensure consistency, when a core 110.0 makes an ownership request, the cache line is not cached in SCA 210.S. Also, if the core 110.0 only makes a read access request, a non-modifiable shared cache line is granted this core 110.0. Any core IWB that retains a modifiable state for the cache line bypasses SCA 210.S and writes directly to SMC 220.S. Additionally, any prefetching to SCA 210.S is disabled.

PCA 210.P in its coherency resolution takes the responsibility to ensure the SMC 220.S is updated with modified data from a snooped core 110.1 before the requesting core 110.0 may access the SCA 210.S. To achieve this, if on an access request the snoop filter 216.P indicates a potential modifiable line in any core 110, the PCA 210.P holds the redundant access manager 120 from sending the redundant access request to SCA 210.S. Instead the snoop filter 216.P of the PCA 210.P first snoops the core 110.1, and if dirty (modified) data is received in response, also does IWB of this dirty data this to the SMC 220.S. The redundant access manager 120 only sends the access request to SCA 210.S after receiving a primary GO signal for this cache line. The redundant access request sent to SCA 210.S will see a secondary cache miss for this line because, as mentioned above, such lines are not cached in the SCA 210.S, and when fetching from the SMA 220.S, the redundant access manager 120 receives the IWB updated line.

A more detailed explanation of the PCA 210.P managing coherency fir read access request will now be described with respect to FIG. 4.

During the primary request phase, request access manager 120.0 of a first core 110.0 sends a read access request to the PCA 210.P.

During the snoop phase, coherency processing begins. The snoop filter 216.P provided in the PCA 210.P has an entry for each cache line. The snoop filter 216.P is thus configured to, in response to receiving the read access request from the first core 110.0, send a snoop request to a second core 110.1.

During the primary data phase, the PCA 210.P send the data, in response to the read access request, to the requesting first core 110.0. And if a snoop response from the previous phase includes dirty (modified) data, the PCA 210.P is configured to perform an implicit writeback (IWB) of the dirty data to the SMC 220.S, and send a Cyclic Redundancy Check (CRC) value of the dirty data to the SCA 210.S. The dirty data goes through the PCA 210.P for coherency. The IWB of the dirty data bypasses the SCA 210.S, as also indicated by the dotted line in FIG. 1 from the IWB data checker 22.S in the SMC 220.S to the coherency controller 214.P. The PCA 210.P may store the dirty data on its shared last level cache 212.P. The SMC 220.S subsequently sends a completion signal in response.

During the primary GO-secondary request phase, the PCA 210.P sends a GO signal to the first redundant access manager 120.0 indicating cache coherency. In response, the first redundant access manager 120.0 is configured to send to the SCA 210.S the redundant copy of the read access request.

During the secondary data-GO phase, the SCA 210.S sends a read access request to the SMC 220.S, which the PCA 210.P already updated. The data in response to this read access request gets returned to the first redundant access manager 120.0 directly; the data bypasses the SCA 210.S.

The redundant data manger 120 returns the first data it receives back at the first core 110.0. However the redundant data manger 120 does not send a GO signal to the first core 110.0 until the data comparator 130.0 has received the redundant data and the data comparator 130 has performed the comparison between the first data and the redundant data. This ensures that read latency is not compromised, but the instruction cannot retire much before detection of a possible fault. When a program is executed and an instruction causes a memory store initiating a read/write access request in the cache-coherent memory fabric 200, the data compare or coherency checks are done and any failure flagged before the cache-coherent memory fabric 200 returns a GO signal to the requesting core 110.0. The associated instruction can only retire after receiving this GO signal, and a subsequent dependent command from this program can only be dispatched afterwards. The early failure flagging helps the system detect failure within a FDTI (fault detection tolerance interval) window.

Figure 5:
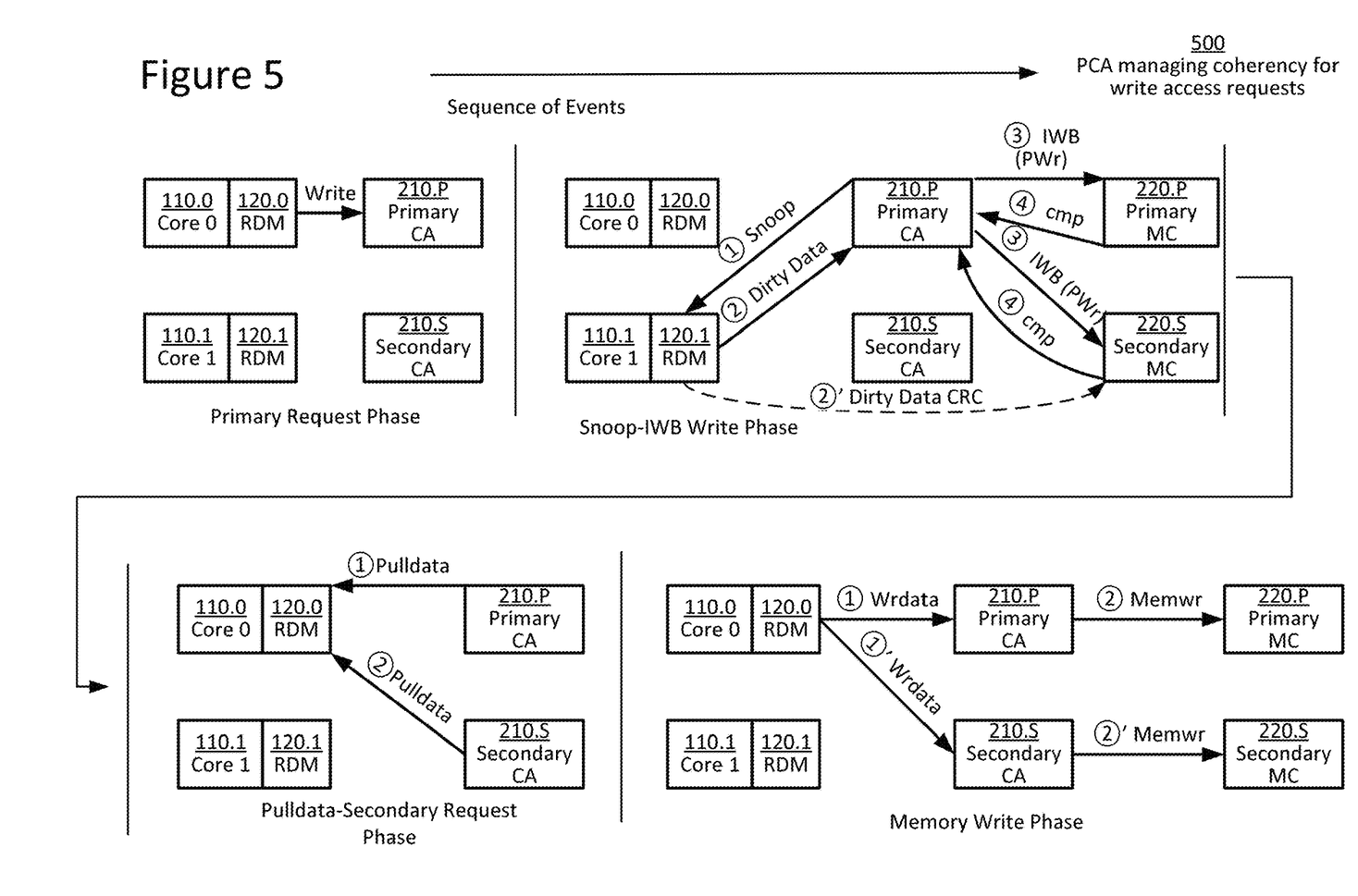
FIG. 5 illustrates a sequence diagram of primary cache agent managing coherency for write access requests in accordance with aspects of the disclosure.

FIG. 5 illustrates a sequence diagram 500 of primary cache agent managing coherency for write access requests in accordance with aspects of the disclosure.

By way of overview, when a core 110 requests to write data to the memory 700, the PCA 210.P pulls any previously written data from the other cores 110, and has this pulled data stored in both the PMC 220.P and the SMC 220.S. The new data can then be written to the PMC 220.P and the SMC 220.S.

During the primary request phase, request access manager 120.0 of a first core 110.0 sends a write access request to the PCA 210.P.

During the snoop-IWB write phase, the snoop filter 216.P is configured to, in response to receiving the write access request from the first core 110.0, send a snoop request to the second core 110.1. If a snoop response includes dirty data, the PCA 210.P is configured to perform an implicit writeback (IWB) of the dirty data to both the SMC 220.S and the SMC 220.S, which each in response returning a completion signal. Additionally, to facilitate the redundancy check, the second redundant access manager 120 sends a CRC value of the dirty data to SMC 220.S, and the CRC value is checked there against the IWB data received. This check gates the return of the completion signal from SMC 220.s for the secondary side request.

During the pulldata-secondary request phase, the PCA 210.P sends a pulldata signal to the first redundant access manager 120.0. The SCA 120.S also sends a pulldata signal to the first redundant access manager 120.0.

During the memory write phase, the first redundant access manager 120.0 is configured to, in response to receiving the pulldata signal from the PCA, write data to the PCA 210.P. Similarly, the first redundant access manager 120.0, in response to receiving a pulldata signal from the SCA 210.S, write a redundant copy of the data to the SCA 210.S. Finally, the PCA 210.P is configured to write the written data to the PMC 220.P, and the SCA 210.S is configured to write the redundant copy of the written data to the SMC 220.S.

Figure 6:
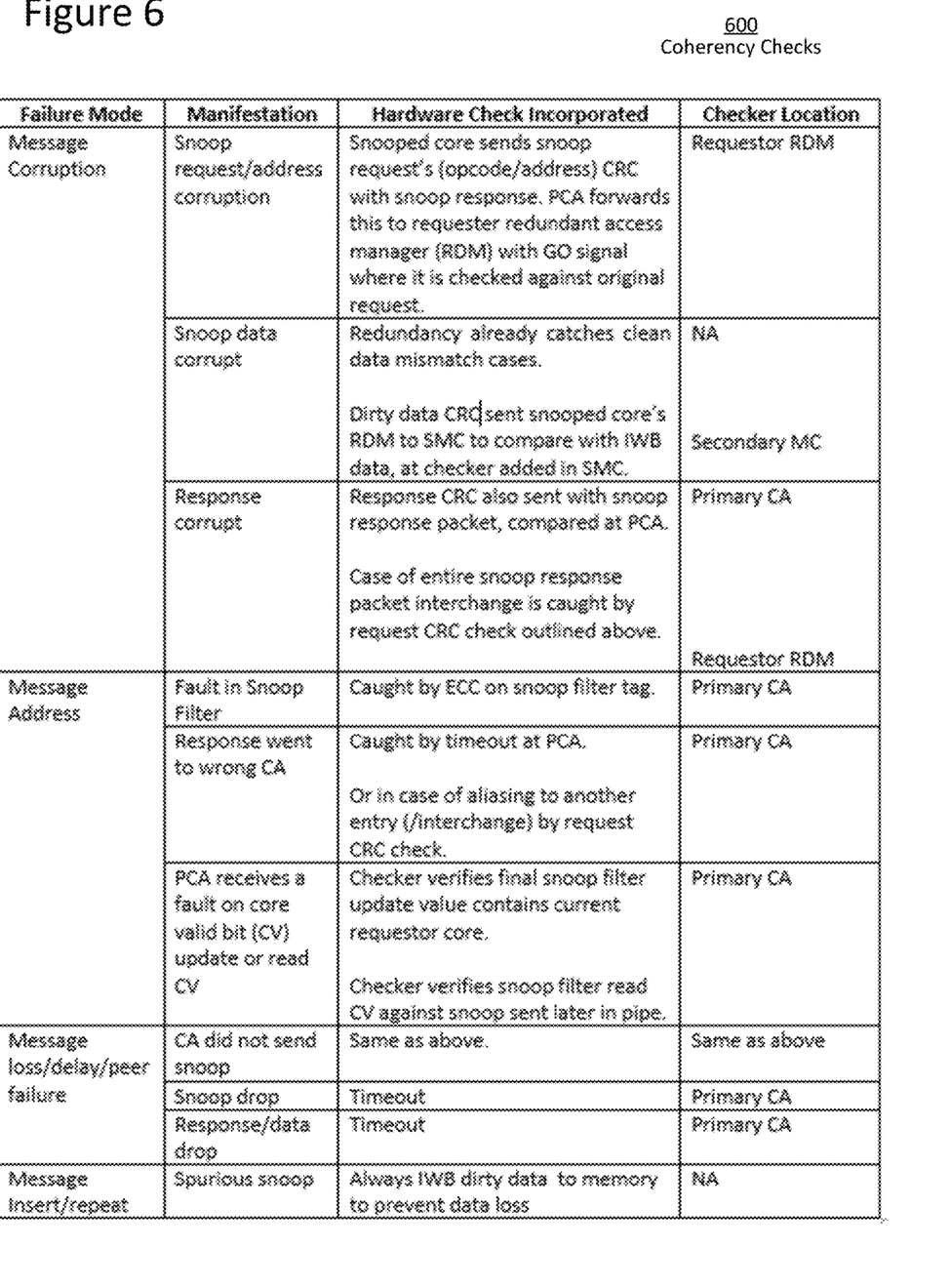
FIG. 6 illustrates a chart of available coherency checks in accordance with aspects of the disclosure.

FIG. 6 illustrates a chart of available coherency checks. These coherency checks detect faults that might occur during the coherency management that is exclusively performed at the PCA 210. Each of the failure manifestations listed is considered to be fatal.

Figure 7:
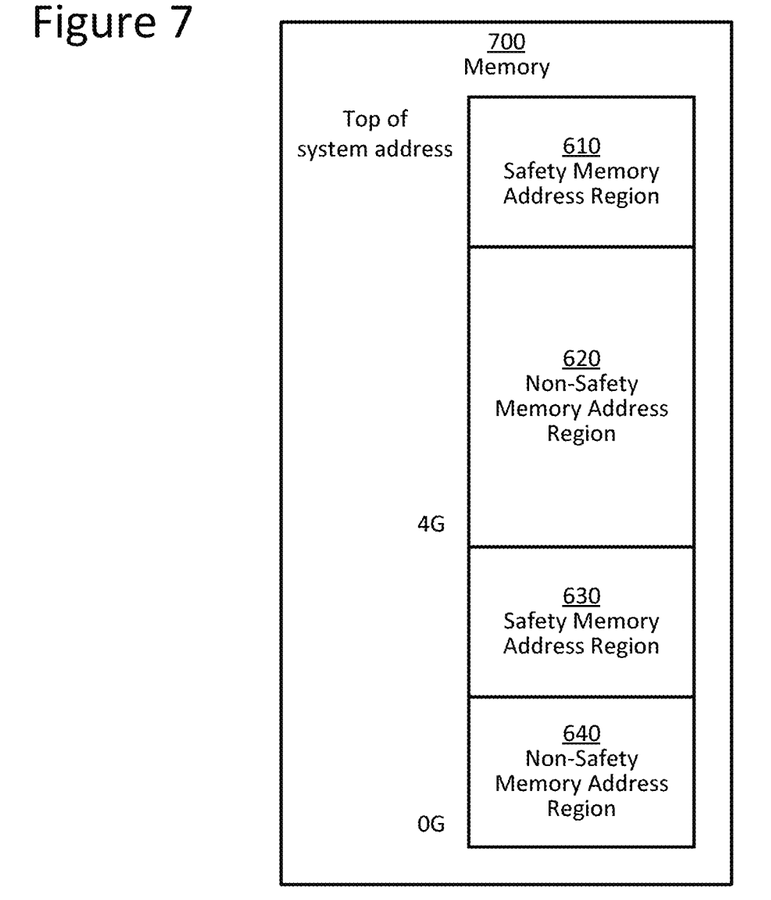
FIG. 7 illustrates an example system address map with safety memory address regions and non-safety memory address regions in accordance with aspects of the disclosure.

FIG. 7 illustrates an example memory 700 having a memory address map in accordance with aspects of the disclosure.

The memory 700 has an address space divided into one or more safety memory address regions 710, 730, and one or more non-safety memory address regions 720, 740. The safety memory address regions 710, 730 may be allocated to safety-related applications, such as ASIL-compliant applications. This demarcation can be established by the Basic Input/Output System (BIOS) when setting up the memory addresses on system boot. The redundant access manager 120 is configured to redundantly distribute the access request only if the access request is for memory access within a safety memory address region 710,730.

The non-safety memory address region 720, 740 is evenly distributed over all instances of CA 210 and all memory channels. There is no redundancy and all the cache and memory between is available when addressing the non-safety memory address region 720, 740.

Since any transactions from non-safety-related applications to non-safety memory address regions 720, 740 will touch only one CA 210 and one physical memory image, any faults introduced during a transactions in the memory/fabric state or cache/memory data stored that can impact a subsequent safety-relation application's transaction will corrupt only one half of their redundant processing. Thus this failure should be caught by the redundancy checker. For example, if while processing non-safety-related transaction the memory address gets corrupted while writing to cache/memory such that the written address is in a safety memory address region, when this address is later read by a safety-related application only one of the redundant accesses will observe this corrupted data leading to a failure of the redundant data compare. In this way the mechanism ensures freedom from interference (FFI).

Figure 8:
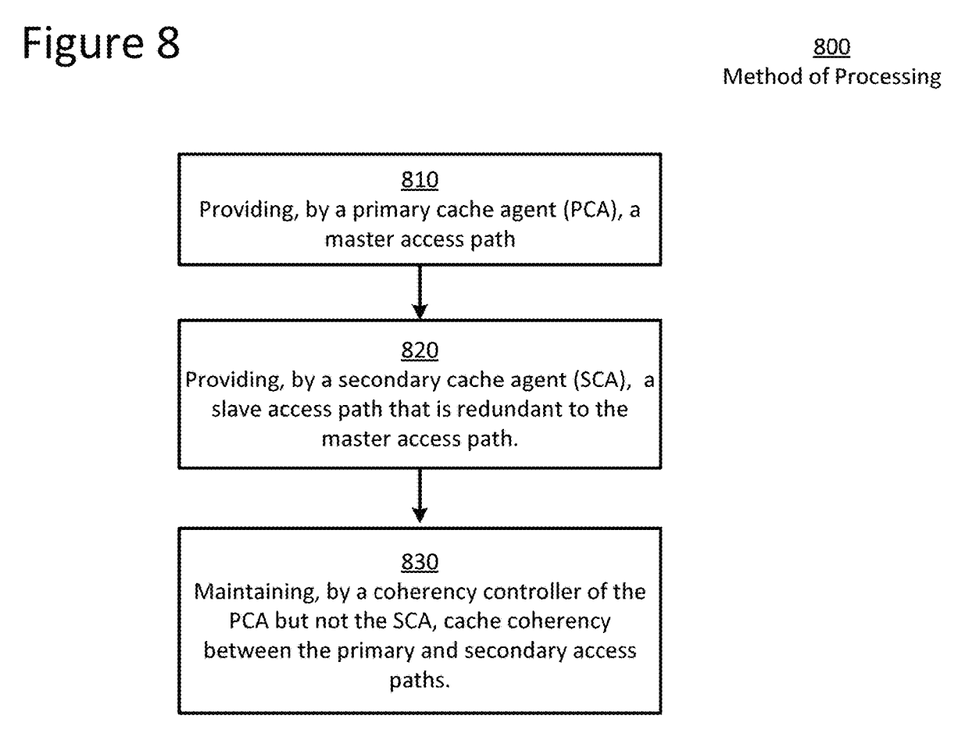
FIG. 8 illustrates a flowchart of a method of processing in accordance with aspects of the disclosure.

FIG. 8 illustrates a flowchart of a method of processing 800 in accordance with aspects of the disclosure.

At Step 810, the method includes providing, by a PCA 210.P, a primary access path.

At Step 820, the method continues by providing, by a SCA 210.S, a secondary access path that is redundant to the primary access path.

At Step 830, the method continues by maintaining, by a coherency controller 214.P of the PCA 210.P but not the SCA 210.S, cache coherency between the primary and secondary access paths.

The techniques of this disclosure may also be described in the following examples.

Example 1. A processor, comprising: a core; and a cache-coherent memory fabric coupled to the core and having: a primary cache agent (PCA) configured to provide a primary access path; and a secondary cache agent (SCA) configured to provide a secondary access path that is redundant to the primary access path, wherein the PCA has a coherency controller configured to maintain data in the secondary access path coherent with data in the main access path.

Example 2. The processor of example 1, further comprising: a redundant access manager provided at the core and configured to distribute an access request from the core to the PCA, and a redundant copy of the access request to the SCA.

Example 3. The processor of example 2, wherein the cache-coherent memory fabric is configured to enable the core to access a memory having an address space divided into a safety memory address region and non-safety memory address region, and the redundant access manager is configured to redundantly distribute the access request only if the access request is for access within the safety memory address region.

Example 4. The processor of example 2, wherein the PCA comprises a cache controller configured to: select the access request, which is to be processed by the PCA; and send an allocation signal to the redundant access manager, wherein the redundant access manager is configured to, after receiving the allocation signal, send to the SCA the redundant copy of the access request.

Example 5. The processor of example 2, wherein the redundant access manager is configured to, after receiving from the SCA a global observation signal indicating that the SCA has completed processing the redundant copy of the access request, send to the PCA an allow-deallocation signal permitting the PCA to deallocate after completing its processing of the access request.

Example 6. The processor of example 1, further comprising: a coherency checker provided in the PCA or the redundant access manager, and configured to detect faults in the coherency controller.

Example 7. The processor of example 2, further comprising: a data comparator provided at the core, and configured to compare data read through the primary access path in response to the access request, with redundant data read through the secondary access path in response to the redundant copy of the access request.

Example 8. The processor of example 2, wherein the cache-coherent memory fabric comprises: a primary memory controller (PMC) coupled to at least the PCA; and a secondary memory controller (SMC) coupled to at least the SCA.

Example 9. The processor of example 8, wherein the core is a first core and the redundant access manager is the first redundant access manager, and the processor further comprises: a second core; a second redundant access manager provided at the second core; a snoop filter provided in the PCA and configured to, in response to receiving an access request from the first core, send a snoop request to the second core, wherein if a snoop response includes dirty data, the PCA is configured to perform an implicit writeback (IWB) of the dirty data to the SMC.

Example 10. The processor of example 9, wherein the IWB of the dirty data bypasses the SCA.

Example 11. The processor of example 9, wherein the first redundant access manager is configured to, after the first redundant access manager receives from the PCA a primary global observation signal indicating cache coherency, send to the SCA the redundant copy of the access request.

Example 12. The processor of example 9, wherein if the snoop response includes dirty data, the second redundant access manager is configured to send a Cyclic Redundancy Check (CRC) value of the dirty data to the SMC, which is configured to perform a redundancy check on the IWB dirty data.

Example 13. The processor of example 9, wherein if the access request is a write access request and the snoop response includes dirty data, the PCA is configured to perform an IWB of the dirty data to the PMC and the SMC.

Example 14. The processor of example 13, wherein the first redundant access manager is configured to: in response to receiving a pull data signal from the PCA, write data to the PCA; and in response to receiving a pull data signal from the SCA, write a redundant copy of the data to the SCA.

Example 15. The processor of example 14, wherein the PCA is configured to write the written data to the PMC, and the SCA is configured to write the redundant copy of the written data to the SMC.

Example 16. The processor of example 9, wherein if the access request is a read access request and the snoop response includes dirty data, the second redundant access manager is configured to send a Cyclic Redundancy Check (CRC) value of the dirty data to the SCA.

Example 17. The processor of example 1, wherein the cache-coherent memory fabric is configured to manage access requests for memory addresses allocated to safety-related applications.

Example 18. A method of processing, comprising: providing, by a primary cache agent (PCA), a primary access path; providing, by a secondary cache agent (SCA), a secondary access path that is redundant to the primary access path; and maintaining, by a coherency controller of the PCA, data in the secondary access path coherent with data in the main access path.

Example 19. The method of example 18, further comprising: distribute, by a redundant access manager provided at the core, an access request from the core to the PCA, and a redundant copy of the access request to the SCA.

Example 20. The method of example 19, further comprising: selecting, by a cache controller of the PCA, the access request, which is to be processed by the PCA; sending, by the cache controller, an allocation signal to the redundant access manager; and sending, by the redundant access manager, after receiving the allocation signal, to the SCA the redundant copy of the access request.

Example 21. The method of example 18, further comprising: detecting, by a coherency checker provided in the PCA or the redundant access manager, faults in the coherency controller.

Example 22. The method of example 19, further comprising: comparing, by a data comparator provided at the core, data read through the primary access path in response to the access request, with redundant data read through the secondary access path in response to the redundant copy of the access request.

Example 23. The method of example 19, wherein the core is a first core and the redundant access manager is the first redundant access manager, the method further comprising: sending, by a snoop filter provided in the PCA in response to receiving an access request from the first core, a snoop request to a second core; and performing, by a primary memory controller (PMC) coupled to the PCA, if a snoop response includes dirty data, an implicit writeback (IWB) of the dirty data to a secondary memory controller (SMC) coupled to the SCA.

Example 24. A processor, comprising: a core; and a cache-coherent memory fabric coupled to the core and having: a primary cache agent (PCA) means for providing a primary access path; and a secondary cache agent (SCA) means for providing a secondary access path that is redundant to the primary access path, wherein the PCA means has a coherency controlling means for maintaining data in the secondary access path coherent with data in the main access path.

Example 25. The processor of example 24, further comprising: a redundant access managing means, which is providing at the core, for distributing an access request from the core to the PCA, and a redundant copy of the access request to the SCA.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A processor, comprising:
a core; and
a cache-coherent memory fabric coupled to the core and having:
 a primary cache agent (PCA) configured to provide a primary access path; and
 a secondary cache agent (SCA) configured to provide a secondary access path that is redundant to the primary access path,
 wherein the PCA has a coherency controller configured to maintain data in the secondary access path coherent with data in the primary access path, while the SCA has a disabled coherency controller.

2. The processor of claim 1, further comprising:
a redundant access manager provided at the core and configured to distribute an access request from the core to the PCA, and a redundant copy of the access request to the SCA.

3. The processor of claim 2, wherein the cache-coherent memory fabric is configured to enable the core to access a memory having an address space divided into a safety memory address region and non-safety memory address region, and the redundant access manager is configured to redundantly distribute the access request only if the access request is for access within the safety memory address region.

4. The processor of claim 2, wherein the PCA comprises a cache controller configured to:
select the access request, which is to be processed by the PCA; and
send an allocation signal to the redundant access manager, wherein the redundant access manager is configured to, after receiving the allocation signal, send to the SCA the redundant copy of the access request.

5. The processor of claim 2, wherein the redundant access manager is configured to, after receiving from the SCA a global observation signal indicating that the SCA has completed processing the redundant copy of the access request, send to the PCA an allow-deallocation signal permitting the PCA to deallocate after completing its processing of the access request.

6. The processor of claim 1, further comprising:
a coherency checker provided in the PCA or the redundant access manager, and configured to detect faults in the coherency controller.

7. The processor of claim 2, further comprising:
a data comparator provided at the core, and configured to compare data read through the primary access path in response to the access request, with redundant data read through the secondary access path in response to the redundant copy of the access request.

8. The processor of claim 2, wherein the cache-coherent memory fabric comprises:

a primary memory controller (PMC) coupled to at least the PCA; and a secondary memory controller (SMC) coupled to at least the SCA.

9. The processor of claim 8, wherein the core is a first core and the redundant access manager is the first redundant access manager, and the processor further comprises:

a second core;

a second redundant access manager provided at the second core;

a snoop filter provided in the PCA and configured to, in response to receiving an access request from the first core, send a snoop request to the second core, wherein if a snoop response includes dirty data, the PCA is configured to perform an implicit writeback (IWB) of the dirty data to the SMC.

10. The processor of claim 9, wherein the IWB of the dirty data bypasses the SCA.

11. The processor of claim 9, wherein the first redundant access manager is configured to, after the first redundant access manager receives from the PCA a primary global observation signal indicating cache coherency, send to the SCA the redundant copy of the access request.

12. The processor of claim 9, wherein if the snoop response includes dirty data, the second redundant access manager is configured to send a Cyclic Redundancy Check (CRC) value of the dirty data to the SMC, which is configured to perform a redundancy check on the IWB dirty data.

13. The processor of claim 9, wherein if the access request is a write access request and the snoop response includes dirty data, the PCA is configured to perform an IWB of the dirty data to the PMC and the SMC.

14. The processor of claim 13, wherein the first redundant access manager is configured to:

in response to receiving a pull data signal from the PCA, write data to the PCA; and in response to receiving a pull data signal from the SCA, write a redundant copy of the data to the SCA.

15. The processor of claim 14, wherein the PCA is configured to write the written data to the PMC, and the SCA is configured to write the redundant copy of the written data to the SMC.

16. The processor of claim 9, wherein if the access request is a read access request and the snoop response includes dirty data, the second redundant access manager is configured to send a Cyclic Redundancy Check (CRC) value of the dirty data to the SCA.

17. The processor of claim 1, wherein the cache-coherent memory fabric is configured to manage access requests for memory addresses allocated to safety-related applications.

18. A method of processing, comprising:

providing, by a primary cache agent (PCA), a primary access path;

providing, by a secondary cache agent (SCA), a secondary access path that is redundant to the primary access path; and maintaining, by a coherency controller of the PCA, data in the secondary access path coherent with data in the primary access path, while the SCA has a disabled coherency controller.

19. The method of claim 18, further comprising:

distribute, by a redundant access manager provided at the core, an access request from the core to the PCA, and a redundant copy of the access request to the SCA.

20. The method of claim 19, further comprising:

selecting, by a cache controller of the PCA, the access request, which is to be processed by the PCA;

sending, by the cache controller, an allocation signal to the redundant access manager; and sending, by the redundant access manager, after receiving the allocation signal, to the SCA the redundant copy of the access request.

21. The method of claim 18, further comprising:

detecting, by a coherency checker provided in the PCA or the redundant access manager, faults in the coherency controller.

22. The method of claim 19, further comprising:

comparing, by a data comparator provided at the core, data read through the primary access path in response to the access request, with redundant data read through the secondary access path in response to the redundant copy of the access request.

23. The method of claim 19, wherein the core is a first core and the redundant access manager is the first redundant access manager, the method further comprising:

sending, by a snoop filter provided in the PCA in response to receiving an access request from the first core, a snoop request to a second core; and performing, by a primary memory controller (PMC) coupled to the PCA, if a snoop response includes dirty data, an implicit writeback (IWB) of the dirty data to a secondary memory controller (SMC) coupled to the SCA.

24. A processor, comprising:

a core; and a cache-coherent memory fabric coupled to the core and having:

a primary cache agent (PCA) means for providing a primary access path; and a secondary cache agent (SCA) means for providing a secondary access path that is redundant to the primary access path, wherein the PCA means has a coherency controlling means for maintaining data in the secondary access path coherent with data in the primary access path, while the SCA means has a disabled coherency controlling means.

25. The processor of claim 24, further comprising:

a redundant access managing means, which is providing at the core, for distributing an access request from the core to the PCA, and a redundant copy of the access request to the SCA.

26. A processor, comprising:

a first core;

a cache-coherent memory fabric coupled to the first core and having:

a primary cache agent (PCA) configured to provide a primary access path;

a secondary cache agent (SCA) configured to provide a secondary access path that is redundant to the primary access path, wherein the PCA has a coherency controller configured to maintain data in the secondary access path coherent with data in the primary access path, and the SCA lacks or has a disabled coherency controller;

a primary memory controller (PMC) coupled to at least the PCA; and a secondary memory controller (SMC) coupled to at least the SCA; and a first redundant access manager provided at the first core and configured to distribute an access request from the first core to the PCA, and a redundant copy of the access request to the SCA, a second core;

a second redundant access manager provided at the second core; and a snoop filter provided in the PCA and configured to, in response to receiving an access request from the first core, send a snoop request to the second core, wherein if a snoop response includes dirty data, the PCA is configured to perform an implicit writeback (IWB) of the dirty data to the SMC, wherein the first redundant access manager is configured to, after the first redundant access manager receives from the PCA a primary global observation signal indicating cache coherency, send to the SCA the redundant copy of the access request.

* * * * *